Inventor
WILLIAM PAUL EDEN
by *A. Irwin Haskett*
Attorney

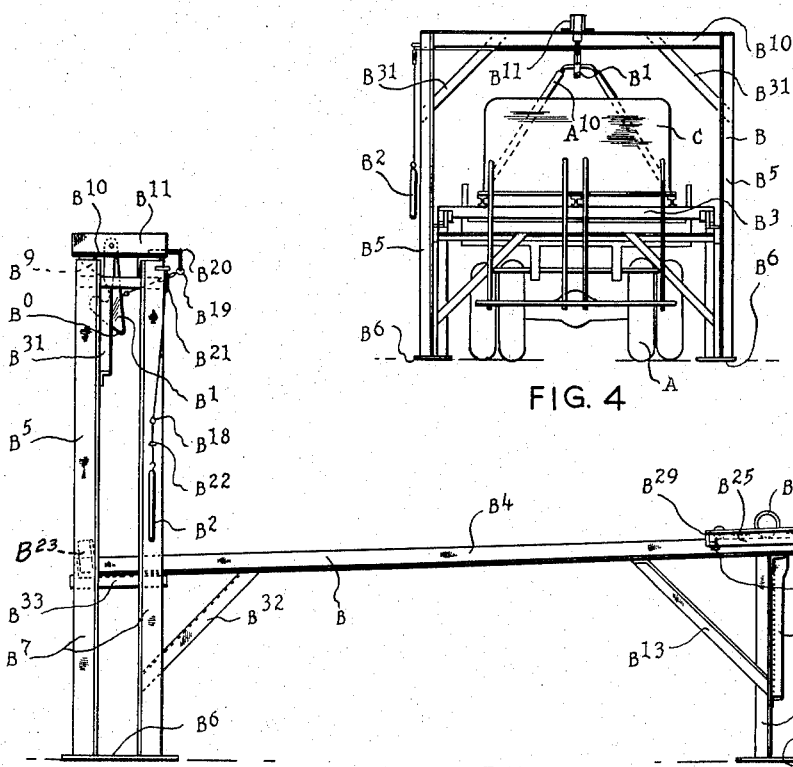
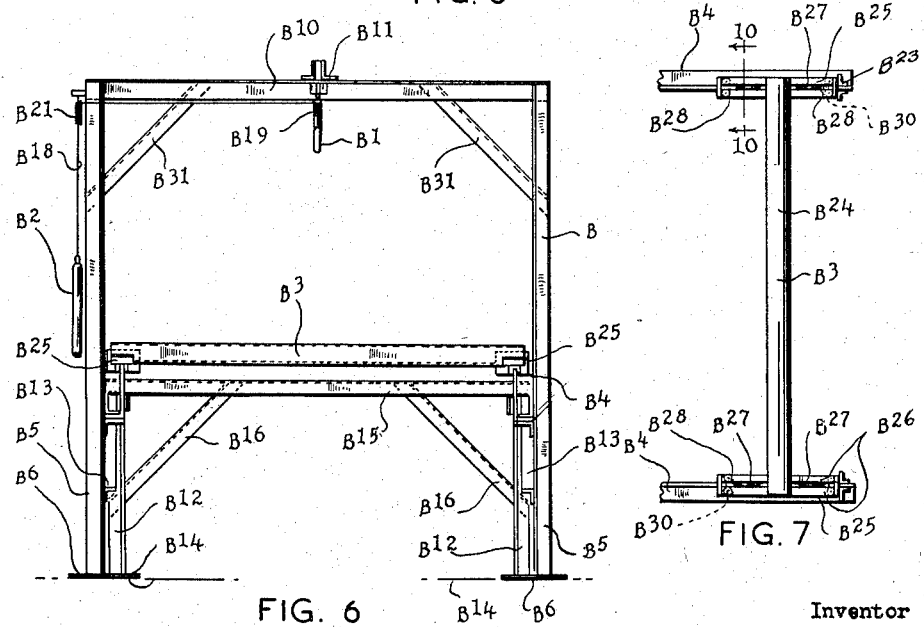

Feb. 24, 1959 — W. P. EDEN — 2,874,858
LOADING AND UNLOADING RACKS
Filed Aug. 26, 1955 — 3 Sheets-Sheet 3

Inventor
WILLIAM PAUL EDEN
by *L. Irwin Hackett*
Attorney

# United States Patent Office 2,874,858
Patented Feb. 24, 1959

2,874,858

LOADING AND UNLOADING RACKS

William Paul Eden, Port Arthur, Ontario, Canada, assignor of twenty-five percent to Marathon Corporation of Canada Limited, West Toronto, Ontario, Canada Application August 26, 1955, Serial No. 530,682

11 Claims. (Cl. 214—38)

My invention relates to truck loading and unloading racks.

It is the function of dump trucks to convey with dispatch merchandise from a place of loading to a place of delivery or unloading and time expended in the loading and unloading of the truck reduces the economy of operation since when a truck is static or immobilized during the usual loading and unloading operations its earning power is lessened and such delays seriously reduce the effective running schedule of the truck.

In the loading and unloading of dump trucks many manual operations are performed and these are time consuming besides being open to all the objections and frailties of manual operations and one of the objects of my invention is to eliminate manual operations.

A further object of the invention is to provide a loading rack for a dump truck enabling the easy and rapid loading or unloading of the truck with such different kinds of transferable loads as an open box for garbage collection, gravel hauling or sand scattering, a water tank for road sprinkling, fire fighting and the like whereby one truck may be employed by a municipality or private owner in a variety of ways and overcome the need to purchase and maintain a number of trucks, some of which might stand idle much of the time.

Other objects are to make the loader or rack of strong and durable construction, to reduce the number of working parts, to minimize the number of moving parts and so reduce the liability of the rack going out of repair.

Dump trucks are usually constructed with a body tiltable in a longitudinal direction and such trucks are equipped with hydraulic jacks or other suitable hoisting gear by means of which that end of the truck body adjacent the driver's seat may be elevated and lowered as and when desired.

My invention uses this truck mechanism in loading and unloading operations and I also utilize the movement of the truck, both backward and forward in the loading and unloading and this assists in eliminating manual operations so making loading and unloading operations automatic.

This automatic action not only expedites loading and unloading of a dump truck but reduces undue delays so that the operating efficiency and versatility of the truck are increased and economical advantages are obtained by the elimination of man-hours of labour previously used and by enabling one truck to serve a plurality of uses that might previously have required the operation of a number of specially equipped truck units.

These units I have obtained by my new and useful truck loading and unloading rack which is designed to effectively perform the functions required of it.

In reducing my invention to practice, its effective results are obtained by constructing a loader mechanism or rack into which a dump truck may be backed and subsequently driven out of, and the loader structure or rack functions in such a way that the translatory movement of the truck in either direction is utilized to advantage in the loading or unloading of the truck.

In the specification whenever the word rack is used it is to be understood that it means and includes both a loading and unloading mechanism.

With the above and other objects in view I have constructed a loading rack and have illustrated an embodiment of the same which I shall describe in detail, but it must be understood that I do not limit myself to this specific construction but reserve the right to modify and/or change the same within the scope of my appended claims.

So that the nature of my invention will be clearly understood reference is made to the accompanying drawings in which:

Figure 4 is an elevation from the rear end of my loading rack and showing the truck backed into the rack;

Figure 5 is a side elevation of my loading and unloading rack when empty or unoccupied;

Figure 6 is a front elevation of the same;

Figure 7 is a plan view of the carrier which is designed to carry the rear end of the tank platform, the carrier having side carriages rotatably supported on the inclined rails of the rack, the rails being shown broken away;

Like characters of reference refer to like parts in the several figures.

Figure 1:
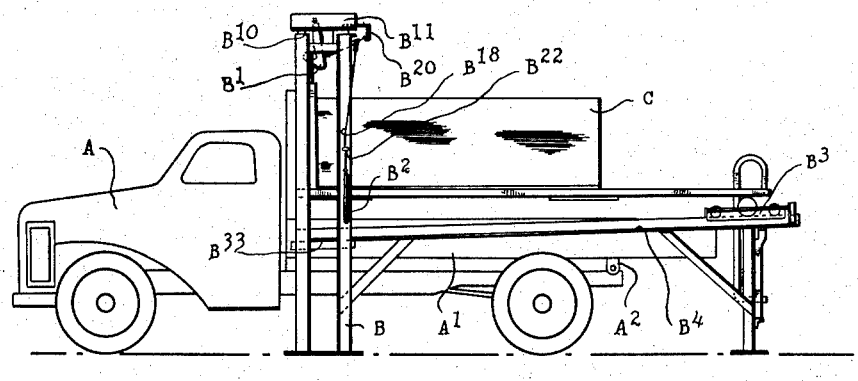
Figure 1 is a side elevation of a dump truck backed into my loading rack and showing a transferable load, viz., a tank mounted on a suspended platform and awaiting loading on the truck.
Figure 2:
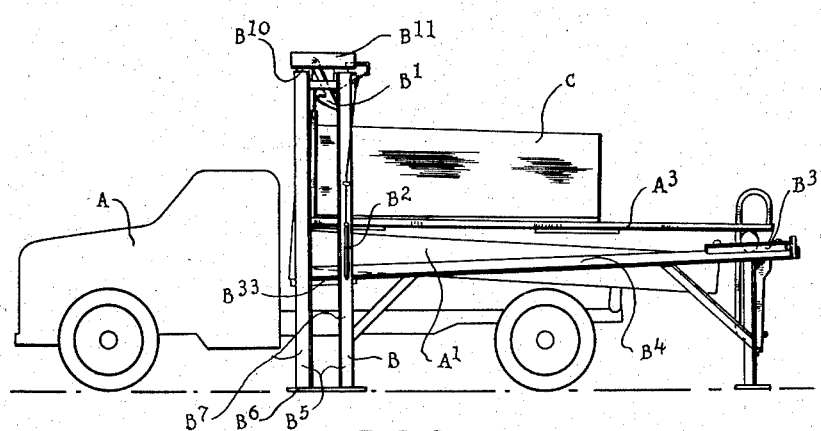
Figure 2 shows the dump truck in side elevation with the dump body raised to release the tank and its platform from the rack and permit lowering of the platform and tank on the truck.

Referring to the drawings, A represents a dump truck of usual commercial type provided with a body A1 which is pivotally supported adjacent its rear end as shown at A2.

The dump truck is provided with the usual hydraulic jack or hoisting gear by means of which the front end of the truck body may be elevated and lowered, the body of the truck being tiltable longitudinally on the pivotal support A2.

The tilting mechanism with which the truck A is equipped is not illustrated as it is not (per se) my invention, but I use this tilting mechanism when loading and unloading the truck.

In association with the tiltable dump truck body A1 I use a load carrying platform A3 which is constructed of a plurality of equidistantly spaced and longitudinally extending I-beams 4A, the front ends of which are in transverse alignment and are welded to the transversely extending pipe A5. The upper face of the I-beams A4 lie in the same plane and across these upper faces and adjacent to the front ends of the beams I provide a transversely extending angle bar A6 which is secured to the I-beams by welding.

From the ends of this angle bar A6, upwardly and converging members A7 extend and these members are connected adjacent their upper ends to a transverse angle bar A8 by welding so that the frame so formed simulates a trapezoid.

The transverse angle bar A8 is connected by welding to the end of a channel bar A9 which is inclined forwardly and downwardly and its lower end is welded to the front of the central I-beam A4 of the platform A3. It will be clear that this frame is strongly braced to the platform.

The upper converging ends of the angle bars A7 are connected by a bail A10.

Intermediate of the length of the I-beams A4 and on the upper face thereof an angle bar A11 extends transversely thereacross, and is secured to the I-beams by welding, while adjacent the rear ends of the I-beams A4 and on the under face thereof an angle bar A12 extends and is secured to the I-beams by welding. The metallic frame of the platform is consequently strong and rigid.

A ladder A13 is located adjacent the rear ends of the I-beams and this ladder principally formed of tubular material which is light but strong, underlies the rear end of the platform A3.

A wooden floor A14 is provided on the upper faces of the I-beams A4 while on the lower faces of the I-beams resilient pads A15 of rubber or like material are secured by suitable means. The rear end of the complete dump platform A3 when resting on the upper face of the tiltable platform of the dump truck body A1 overhangs the same. This load carrying platform will not slip relatively to the body A1 of the truck since the rubber pads A15 form an efficient frictional anchoring means between the platform and the truck body.

The trapezoidal frame at the front of the platform performs a dual function, firstly it constitutes an efficient barrier between the load on the platform and the driver of the truck and in the event of accident during transportation any forward movement of the load is arrested by the frame, secondly the frame constitutes a yoke by means of which the front end of the platform may be suspended from the rack as will appear hereinafter.

The rack B is constructed at the forward end of two spaced upright side members B5 the lower ends of which are attached to base plates B6. Each of the side members consists of spaced uprights B7 connected adjacent their upper ends by the members B9 and intermediate of their height by the members B33.

The two spaced side members B5 are connected at the upper end by transversely extending angle bars B10 which are connected intermediate of their length by short angle bars B11 from which the hook B1 is pivotally hung. This hook is weighted at the lower end and has an angular upwardly extending straight edge B0. The front of the rack B forms a rectangular frame of substantially arch shape.

The hook B1 is connected to one end of a flexible member B18 which extends rearwardly from the hook, and the flexible member passes around the pulley B19 carried by the bracket B20. The flexible member B18 then extends across the upper part of the arch to one side thereof where it passes over the guide pulley B21 and thence downwardly through the eyelet B22, and the free end of the flexible member is attached to the weight B2. The hook B1 is consequently balanced. The front upright B7 is braced to the angle bar B10 by the strut B31.

Extending rearwardly from the side members B5 of the rectangular frame are a pair of spaced angle bars B4 which are held in parallelism, the forward ends of the angle bars resting on and being suitably secured to the members B33. These angle bars B4 are braced to the rear upright B7 by the strut B32. The angle bars B4 slope upwardly towards the rear of the rack and rest on the vertical supports B12 which are connected by the transversely extending member B15.

The vertical supports B12 are braced at the sides by angularly disposed members B13 to the angle bars B4 and these supports are further braced across the rear end by the angularly disposed members B16 connected to the transverse member B15. The vertical supports rest on the base plates B14.

The upper longitudinal edges of the two parallel spaced angle bars B4 lie in the same inclined plane and a carrier B3 is mounted on these angle bars and this carrier is free to move longitudinally therealong. The movement of the carrier B3 is limited by stops B23 located at each end of the angle bars B4. The carrier B3 is of unique construction and consists of a pipe B24 the ends of which are rigidly connected to the carriages B25 so that the pipe is not rotatable and the carrier moves as a unit on the angle bars B4.

Each carriage consists of a pair of oppositely disposed angle bars B26, arranged with one arm of each angle vertically disposed, the other arm being angularly disposed in parallelism with the upper edge of the angle bars B4.

The angle bars B26 are held in spaced relation by the spacers B27 and between these angle bars discs B28 are rotatably mounted. The periphery of these discs is formed with a concave groove so that the discs lie on and intimately engage the upper edge of the vertical arm of the angle bars B4.

From the vertical arm of the angle bars B26 there depend pins B29 which are welded to the said arms and on the lower projecting ends of these pins discs B30 are rotatably mounted.

The periphery of each disc B30 is flat and designed to engage the lateral faces of the vertical arm of the angle bars B4. It will be clear that the carriages B25 straddle the vertical arm of the angle bars B4 and while the carriages are free to move longitudinally over the angle bars B4 they are held against lateral displacement by the discs B30.

The carrier is free to move as a unit on the angle bars B4 without fear of binding or lateral displacement.

In the embodiment of my invention illustrated a tank C is mounted on the instant load carrying platform A3 and the lower portions of the end walls of the tank engage the transverse angle bars A6 and A11 so that the tank is held against accidental displacement.

Figure 3:
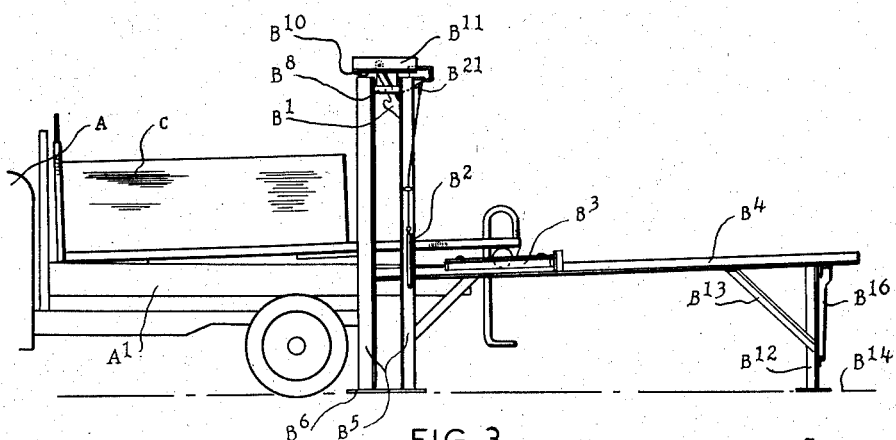
Figure 3 shows the dump truck in side elevation and carrying the forward end of the platform and tank, with the rear end of the platform about to leave the carrier of the loading rack.
Figure 8:
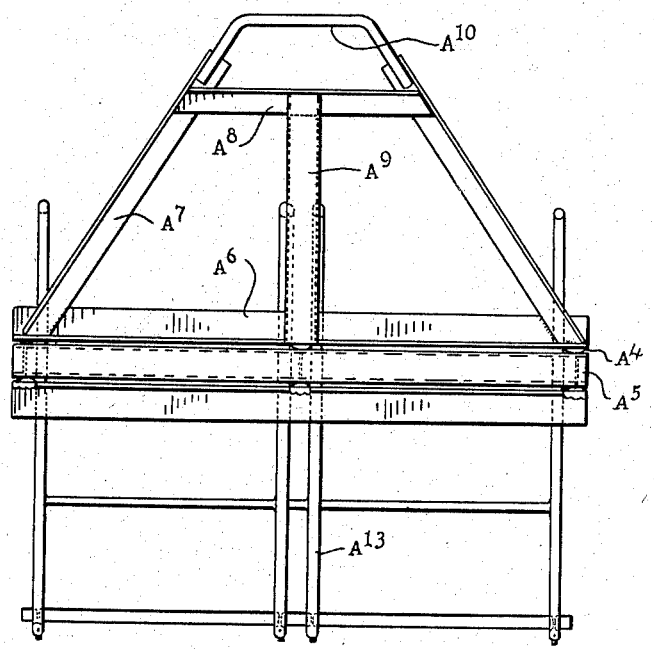
Figure 8 is a front elevation of the instant load carrying platform, minus the tank.
Figure 10:
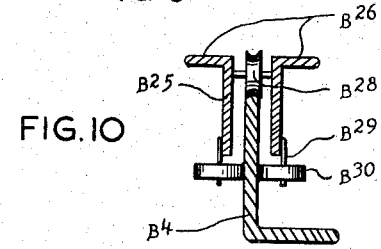
Figure 10 is an enlarged vertical transverse sectional detail through the carrier and its track, as taken on line 10—10 of Figure 7.
Figure 9:
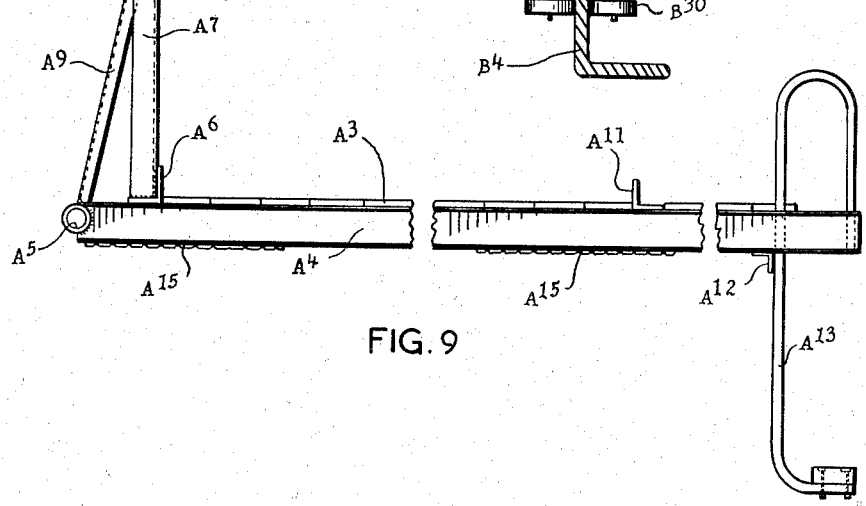
Figure 9 is a side elevation of the same.

The operation of my rack is as follows:

When a load is to be delivered to a depot equipped with my rack, the loaded truck is backed into the rack as shown in Figure 3 and the rear end of the load carrying platform A3 which overhangs the truck body A1 engages the transverse pipe B24 of the carrier B3 which is located at this time at the front lower end of the inclined angle bars B4.

As the truck continues to be backed into the rack, the carrier B3 is pushed towards the upper end of the inclined plane formed by the angle bars B4 and during this movement the rear end of the platform A3 is lifted from the top of the tiltable platform of the dump truck body A1.

The front of the platform A3 still rests on the front end of the truck body A1. When the truck A has been fully backed into the rack the tilting gear of the truck A is operated and the front end of the tiltable platform of body A1 raises the front end of the load carrying platform A3. During this upward movement of the front of the platform the bail A10 of the trapezoidal frame on the platform A3 comes in contact with the front angular edge B0 of the hook B1 so rocking the hook to a rearward position, and when the bail has cleared the said edge of the hook swings forward to engage the bail A10 and as the front of this tiltable platform of the dump truck body A1 is lowered the load carrying platform A3 and its tank C are left suspended as shown in Figure 1.

The dump body A1 of the truck having now been fully lowered the platform A3 and tank C remain suspended as shown in Figure 1 and the truck A may now be driven out of the rack and is ready to be again loaded at another rack or used for other purposes.

When the truck A is to be loaded, the procedure above described is reversed. For instance assuming the tank or other load C on the suspended platform A3 is to be loaded onto a truck then the truck A is backed into the rack as shown in Figure 1. When the truck is at the back of the rack the tilting gear of the truck is operated to tilt the platform of the dump body A1 of the truck so that the upper front end thereof engages the under face of the front of the platform A3. The continued tilting of the body A1 raises the bail A10 so that it disengages the hook B1 which is now moved rearwardly by the balance weight B2 on the flexible member B18.

The hoisting mechanism of the truck is now reversed to lower the front end of the loaded platform A3, and during or following such lowering movement the truck A may be driven forward out of the rack.

On the forward movement of the truck A the rear end of the platform resting on the pipe B24 of the carrier B3 is pulled towards the lower front end of the angle bars B4 so lowering the rear end of the platform A3 on to the truck body A1 which is now in its lowered or horizontal position, and further forward movement of the truck A brings the carrier B3 to its lowest position at the front of the angle bars B4 when the platform A3 is completely lowered on the truck body A1 and the truck A is free to be driven forward out of the rack fully loaded.

During the loading operation and the lowering of the front end of the platform A3 the resilient pads A15 engage the upper face of the truck body A1 so that the loading of the truck A is accomplished without shock or jarring.

A particular advantage of the invention that will be clear is that my rack can be operated by the truck driver alone without additional manual aid.

The rack has been described where the transferable load is a platform-carried tank C, such as may be used when conveying liquids such as water, chemicals and oil, but obviously it may be used in many other and widely different fields and should fill a long felt want in commerce. Furthermore, throughout this specification and the following claims, wherever the terms load carrying platform or load carrying platform and tank are employed they are to be regarded as synonymous with prepared, prearranged or other transferable load.

From the foregoing description taken in connection with the accompanying drawings, it will be manifest that a truck loading and unloading rack is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. The combination of a dump truck, a load carrying platform removably mounted on the tiltable body of said truck, and a rack into which said truck may be backed; wherein the rack has an inclined track by which the rear of the platform is raised from the truck as the truck is backed into the rack and means for engaging and suspending the forward end of said platform when such forward end of the platform is raised by the tilting of the dump truck body, whereby on the lowering of the tiltable body of the truck the vehicle is relieved of the platform and may be driven forwardly out of the rack leaving the load carrying platform suspended therein to be picked up and removed when desired.

2. The combination of a dump truck, a load carrying platform removably mounted on the tiltable body of said truck, and a rack into which said truck may be backed; wherein the rack has an inclined track with a dolly running thereon on which the rear of said platform is engageable and raised from the truck as the truck is backed into the rack and means for engaging and suspending the forward end of said platform when such forward end of the platform is raised by the tilting of the dump truck body, whereby on the lowering of the tiltable body of the truck the vehicle is relieved of the platform and may be driven forwardly out of the rack leaving the load carrying platform suspended therein to be picked up and removed when desired.

3. The combination with the structure as defined in claim 2 of frictional anchoring means between the said platform and the tiltable body of said truck.

4. The combination as defined in claim 3 wherein the frictional anchoring means consists of resilient pads secured on the lower face of the said platform near opposite ends thereof.

5. The combination with a dump truck having a load carrying platform mounted on the tiltable body thereof in free vertically removable relation, of a rack comprising a frame, a pair of spaced angularly disposed members arranged in parallelism and extending rearwardly from the frame and designed to form an inclined plane, a carrier adapted to be engaged by and to bear the rear of said platform permanently mounted on the angularly disposed members and movable as a unit longitudinally on the angularly disposed members according to the movement of said truck, means for preventing lateral displacement of the carrier on the said members, and means on the frame for automatically engaging and supporting the end of the platform remote from the carrier when the platform is elevated on the raising of the tiltable body of the truck, whereby on the lowering of the tiltable body the truck, relieved of the platform, may be driven away.

6. For a dump truck having a load carrying platform mounted on the tiltable body thereof in free vertically removable relation, an automatic loading and unloading rack into which said truck may be backed comprising a pair of spaced elevated rails forming an inclined plane, a transversely disposed dolly movable longitudinally on said rails adapted to be engaged by and to support the rear of said platform and to cause the same to be raised from the tiltable body of said truck as the truck is backed into said rack between said rails, an overhead frame at the forward end of said rack and means carried by said frame engageable with the forward end of said platform when the same is elevated on the raising of the tiltable body of the truck and to suspend said forward end of said platform when the tiltable body of the truck is lowered; said means being automatically disengageable from the forward end of said platform when said platform is subsequently raised and lowered by the operation of the tiltable body of a dump truck.

7. The structure as defined in claim 6 wherein the platform has an upwardly extending yoke-like frame at its forward end and said means is a hook suspended from the rack frame and engageable with said yoke-like frame on the forward end of the platform.

8. The method of transferring a load carrying platform from a self-propelled dump truck to a rack which consists in backing the truck into the rack until the rear of the platform riding up an inclined part of the rack is elevated clear of the truck, operating the tiltable body of the dump truck to raise the front of the platform, suspending the raised forward end of the platform from the rack, lowering the tiltable body of the truck thus completely separating the platform and truck, and driving the truck forwardly away from the rack.

9. The method of transferring a load carrying platform from a self-propelled dump truck to a rack which consists in backing the truck into the rack until the rear of the platform engages a dolly mounted on inclined rails of the rack, further backing the truck so that the platform is elevated at the rear above and clear of the truck as it is borne by the rack dolly travelling up the inclined rails, operating the tiltable body of the dump truck to raise the front of the platform, suspending the raised forward end of the platform from the rack, lowering the tiltable body of the truck thus completely separating the platform and truck, and driving the truck forwardly away from the rack.

10. The method as defined in claim 8 wherein the front of the platform, on being raised by the operation of the tiltable body of the dump truck, is automatically engaged in secure suspension from the rack.

11. The method of automatically transferring a designated load carrying platform to a self-propelled dump truck from a rack on which it is supported which consists in backing the truck into the rack until the tiltable body of the truck underlies the platform, raising the tiltable body of the truck until it engages the forward end of the platform, further raising the tiltable body until the forward end of the platform is released by the rack, lowering the tiltable body of the truck with the platform thereon and driving the truck forwardly from the rack whilst the rear end of the platform lowers onto the truck.

References Cited in the file of this patent

UNITED STATES PATENTS

| | | |
|---|---|---|
| 834,381 | Hartogh | Oct. 30, 1906 |
| 1,122,396 | Jackson | Dec. 29, 1914 |
| 1,237,297 | Capron | Aug. 21, 1917 |
| 2,117,068 | Ludington | May 10, 1938 |
| 2,251,839 | Dondlinger | Aug. 5, 1941 |
| 2,270,242 | Anderson | Jan. 20, 1942 |
| 2,478,578 | Gottshall | Aug. 9, 1949 |
| 2,538,531 | Likens | Jan. 16, 1951 |
| 2,689,137 | Iddings et al. | Sept. 14, 1954 |
| 2,711,835 | Kappen | June 28, 1955 |

FOREIGN PATENTS

| | | |
|---|---|---|
| 130,942 | Australia | Jan. 14, 1949 |